US007920350B2

United States Patent
Au et al.

(10) Patent No.: US 7,920,350 B2
(45) Date of Patent: Apr. 5, 2011

(54) ADAPTIVE DATA RECOVERY PROCEDURE BASED ON RADIAL POSITIONING

(75) Inventors: Hoan A. Au, Palo Alto, CA (US); Theofilos G. Fkiaras, San Jose, CA (US); David H. Jen, San Jose, CA (US); Bernd Lamberts, Cupertino, CA (US); Kris Schouterden, San Jose, CA (US); Douglas M. Zuercher, Morgan Hill, CA (US)

(73) Assignee: Hitachi Global Storage Technologies, Netherlands, B.V., Amsterdam (NL)

( * ) Notice: Subject to any disclaimer, the term of this patent is extended or adjusted under 35 U.S.C. 154(b) by 231 days.

(21) Appl. No.: 12/242,673

(22) Filed: Sep. 30, 2008

(65) Prior Publication Data
US 2010/0079903 A1 Apr. 1, 2010

(51) Int. Cl.
*G11B 27/36* (2006.01)
(52) U.S. Cl. .......................................... 360/53
(58) Field of Classification Search ........................ None
See application file for complete search history.

(56) References Cited

U.S. PATENT DOCUMENTS

| | | | |
|---|---|---|---|
| 5,379,162 A | 1/1995 | Cunningham et al. ........ 360/53 |
| 5,721,816 A | 2/1998 | Kusbel et al. | |
| 5,859,739 A | 1/1999 | Cunningham et al. | |
| 6,038,679 A | 3/2000 | Hanson | |
| 6,094,408 A | 7/2000 | Verboom | |
| 6,188,538 B1 | 2/2001 | Mills et al. | |
| 6,504,675 B1 * | 1/2003 | Shukh et al. ........... 360/125.12 |
| 6,643,084 B1 | 11/2003 | Andrew et al. | |
| 6,771,444 B2 | 8/2004 | Smith et al. | |
| 6,969,989 B1 * | 11/2005 | Mei .............................. 360/31 |
| 7,023,645 B1 * | 4/2006 | Emo et al. .................... 360/31 |
| 7,215,494 B2 | 5/2007 | Wang et al. .................. 360/31 |
| 7,215,502 B2 * | 5/2007 | Tagami ..................... 360/77.08 |
| 7,221,530 B2 * | 5/2007 | Tomiyama et al. ............ 360/55 |
| 7,414,808 B2 * | 8/2008 | Cho et al. .................... 360/75 |
| 7,688,540 B1 * | 3/2010 | Mei et al. ..................... 360/31 |
| 2005/0078580 A1 | 4/2005 | Kochale et al. | |

OTHER PUBLICATIONS

Chiang, et al., "Adaptive Data Recovery Process", *IBM Technical Disclosure Bulletin*, vol. 38, Pub. No. 6 https://www.delphion.com/tdbs/tdb?order=95A+61179, (Jun. 1995),357-358.
Tobari, et al., "Dynamic Data Recovery Procedure on Hard Disk Drive", *IBM Technical Disclosure Bulletin*, vol. 38, Pub. No. 2 https://www.delphion.com/tdbs/tdb?order=95A+60382, (Feb. 1995),449-450.
Lautenschlager, D. A., "Table-Driven Data Recovery Procedures", *IBM Technical Disclosure Bulletin*, Pub. No. 4 https://www.delphion.com/tdbs/tdb?order=90A+62542, (Sep. 1990),65-66.
Kurachi, et al., "Data Recovery with Adaptive Sync Field Length", *IBM Technical Disclosure Bulletin*, vol. 37, Pub. No. 11 https://www.delphion.com/tdbs/tdb?order=94A+63396, (Nov. 1994),385-386.

* cited by examiner

*Primary Examiner* — Hoa T Nguyen
*Assistant Examiner* — James L Habermehl

(57) ABSTRACT

Data recovery information characterizes data recovery procedure (DRP) steps to be performed within a hard disk drive (HDD) in response to a miss. Particular data recovery information corresponds to a radial position of the actuator and, therefore, the position of the magnetic recording read/write head relative to the associated storage media at the location at which the miss occurred. The data recovery information is based on the physical shape of a write pole and on how the physical shape of the pole inherently affects operational data error associated with the head. Because of the foregoing characteristics of such data recovery information, a more efficient and performant data recovery procedure is performed based thereon.

21 Claims, 4 Drawing Sheets

IN RESPONSE TO A MISS, DETERMINE THE RADIAL POSITION OF A READ/WRITE HEAD RELATIVE TO A CORRESPONDING STORAGE MEDIUM
402

ACCESS DATA RECOVERY INFORMATION CORRESPONDING TO THE RADIAL POSITION, WHEREIN THE DATA RECOVERY INFORMATION IS BASED ON THE PHYSICAL SHAPE OF A WRITE POLE OF THE READ/WRITE HEAD AND HOW THE PHYSICAL SHAPE OF THE POLE AFFECTS DATA CROSS-TRACK ERROR ASSOCIATED WITH THE READ/WRITE HEAD
404

FIG. 4

ADAPTIVE DATA RECOVERY PROCEDURE BASED ON RADIAL POSITIONING

TECHNICAL FIELD

Embodiments of the invention relate generally to the field of hard disk drives and, more specifically, to an adaptive data recovery procedure (DRP) as a function of radial position.

BACKGROUND ART

Electronic computing devices have become increasingly important to data computation, analysis and storage in our modern society. Modern direct access storage devices (DASDs), such as hard disk drives (HDDs), are heavily relied on to store mass quantities of data for purposes of future retrieval. As such long term data storage has become increasingly popular, and as the speed of microprocessors has steadily increased over time, the need for HDDs with greater storage capacity to store the increased amount of data has also steadily increased.

Consequently, there are seemingly constant development efforts to improve the areal density of the media implemented in hard disk drives, where the areal density is typically measured as the product of bits per inch ("BPI") and tracks per inch ("TPI"). BPI refers to the number of bits that can be written and later reread per linear inch along a track, whereas TPI refers to the number of individual tracks per radial inch. Furthermore, additional and significant improvements are taking place which fundamentally change how HDDs record data onto the media, such as with patterned media, perpendicular magnetic recording (PMR), thermally assisted recording (TAR), and combinations of the same.

Advancements in areal density result in very narrow data tracks and, therefore, during writing and reading operations it becomes more and more difficult to align the read/write head precisely and accurately at an optimal "on track" location over the recording track. Consequently, data recovery procedures (DRP), which are internal procedures that an HDD performs to locate data in response to a read miss, are playing an increasingly significant role in system performance. This is especially true with HDDs designed for server applications, which typically need to comply with more stringent response time requirements.

SUMMARY OF EMBODIMENTS OF THE INVENTION

An adaptive data recovery procedure (DRP) for a hard disk drive (HDD) is described. Data recovery information characterizes DRP steps to be performed within the HDD in response to a miss. Particular data recovery information corresponds to the particular radial position of the actuator and, therefore, the position of the magnetic recording read/write head relative to the associated storage media at the location at which the miss occurred. The data recovery information is based on the physical shape of a write pole in a magnetic recording read/write head and on how the physical shape of the pole inherently affects operational error associated with the head. According to an embodiment, in response to a miss, the radial position of the head is determined. Corresponding data recovery information is accessed based on the radial position. Because of the foregoing characteristics of such data recovery information, a more efficient and performant data recovery procedure is performed based thereon.

BRIEF DESCRIPTION OF THE DRAWINGS

The accompanying drawings, which are incorporated in and form a part of this specification, illustrate embodiments of the invention and, together with the description, serve to explain the principles of the invention. The drawings are used merely to illustrate principles of the illustrated embodiments, and it is understood that components described in these embodiments have not been drawn to scale.

FIG. 4 is a flow diagram illustrating a process for performing data recovery in a data storage device, according to an embodiment of the invention.

DETAILED DESCRIPTION OF EMBODIMENTS OF THE INVENTION

Figure 1:
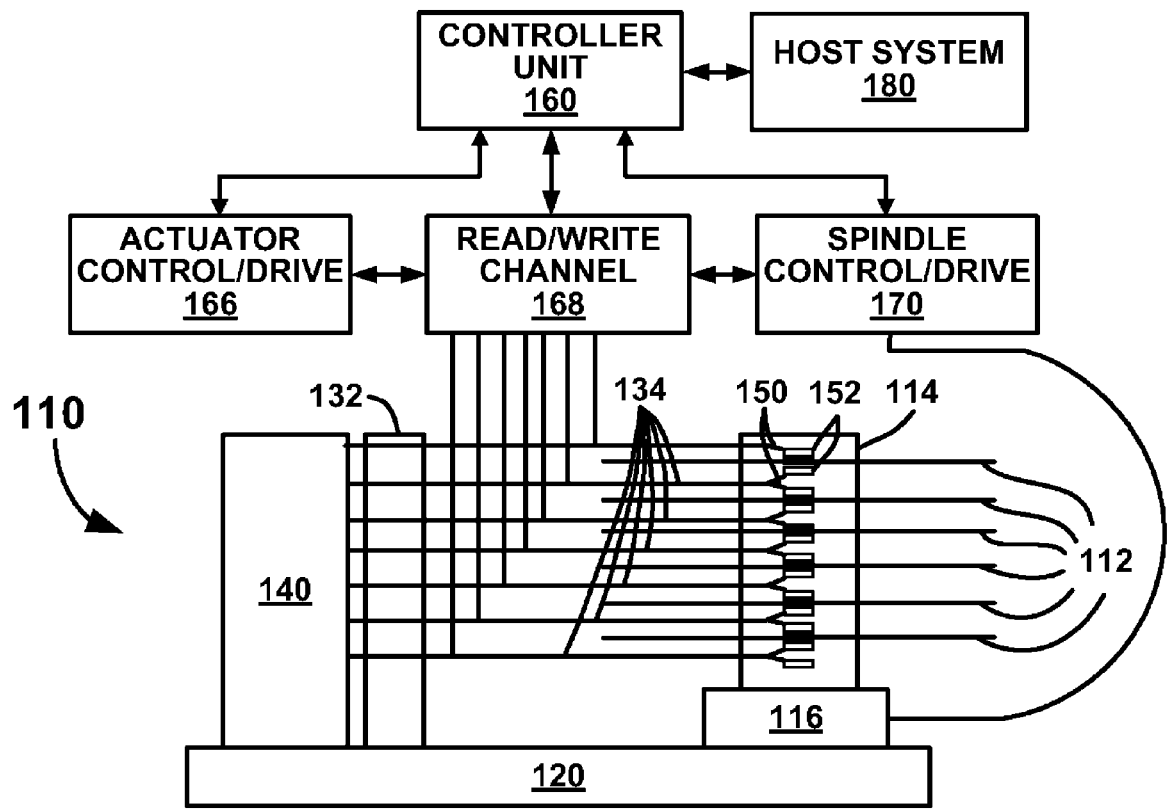
FIG. 1 illustrates a side view of a disk drive system, according to an embodiment of the invention.

Reference will now be made in detail to embodiments of the present technology, examples of which are illustrated in the accompanying drawings. While the technology will be described in conjunction with various embodiments, it will be understood that they are not intended to limit the present technology to these embodiments. On the contrary, the present technology is intended to cover alternatives, modifications and equivalents, which may be included within the spirit and scope of the various embodiments as defined by the appended claims.

Furthermore, in the following detailed description of embodiments of the present invention, numerous specific details are set forth in order to provide a thorough understanding of the present invention. However, it will be recognized by one of ordinary skill in the art that the present invention may be practiced without these specific details. In other instances, well known methods, procedures, and components have not been described in detail as not to unnecessarily obscure aspects of the present invention.

Overview

One aspect of writing somewhat off-track from track center toward an adjacent track is sometimes referred to as a "squeeze" effect. Stated otherwise, at times, writing one track can "squeeze" an adjacent track. Heads can have wide distributions in their ability to handle squeeze effects. Some heads can tolerate more adjacent track squeezing from the writing process before errors are created on adjacent tracks. Other heads are a lot more sensitive to the squeeze and adjacent track errors can be created with a small squeeze effect.

An adaptive data recovery procedure (DRP) for a hard disk drive (HDD) is described. Data recovery information characterizes DRP steps to be performed within the HDD in response to a miss. Particular data recovery information corresponds to the particular radial position of the magnetic recording read/write head relative to the associated storage media at the location at which the miss occurred. The data recovery information is based on the physical shape of a write pole in the head and on how the physical shape of the pole inherently affects operational error associated with the head.

According to an embodiment, in response to a miss, the radial position of the head is determined. Corresponding data recovery information is accessed based on the radial position. Because of the foregoing characteristics of such data recovery information, a more efficient and performant data recovery procedure is performed based thereon.

For a non-limiting example in the context of perpendicular magnetic recording, the shape of the write pole may be trapezoidal and, consequently, a recorded bit takes a form characteristic of the "footprint" of the trapezoidal form. Therefore, the squeeze to adjacent tracks is a strong function of the radial position of the head, i.e., a function of head skew. This leads, in typical high track density scenarios, to an asymmetrically shaped "bath tub" curve (referring to a curve of the error rate vs. the radial location within a given track) after adjacent read/write operations. Consequently, the most appropriate DRP step for a given miss becomes a function of the radial position of the actuator or head. For example, at the disk outer diameter it is more likely that the outer diameter side of the track is squeezed while at the disk inner diameter it is more likely that the inner diameter side of the track is squeezed. Thus, such a priori knowledge is utilized in the DRP process to hasten data recovery and improve the likelihood of success. For example, the DRP steps and/or sequence can be adjusted based on the radial position of the actuator/head, e.g., to preferably position the read sensor away from the more likely squeezed side of the track. Continuing with the trapezoidal pole example leads, therefore, to a DRP that reacts to a miss at the outer diameter portion of the disk by positioning the read sensor first toward the inner diameter of track center.

According to an embodiment, the data recovery information is particular to and is based on measured data regarding a particular head-disk interface (HDI). For example, the data recovery information for a given HDI could be based on an actual measured error rate function corresponding to the given HDI. Consequently, this data recovery information could account for, for example, manufacturing defects in the shape of the write pole.

It should be understood by those skilled in the art that various embodiments of the invention increase the performance quality of a hard disk drive through use of a more efficient adaptive DRP process based on the radial position at which a miss occurs.

Numerous specific embodiments are set forth in detail to provide a more thorough understanding of the present technology. The discussion of these detailed embodiments begins with an overview of a hard disk drive (HDD) and the components connected therein. The discussion then focuses on embodiments of the invention that provide an adaptive DRP as a function of radial positioning and the shape of the write pole. Although embodiments of the present invention are described in conjunction with an adaptive DRP in a hard disk drive, it is understood that the embodiments described herein are useful outside of the art of HDD design, manufacturing and operation. The utilization of the HDD data recovery example is only one embodiment and is provided herein merely for purposes of brevity and clarity.

Hard Disk Drive (HDD) Configuration

Figure 2:
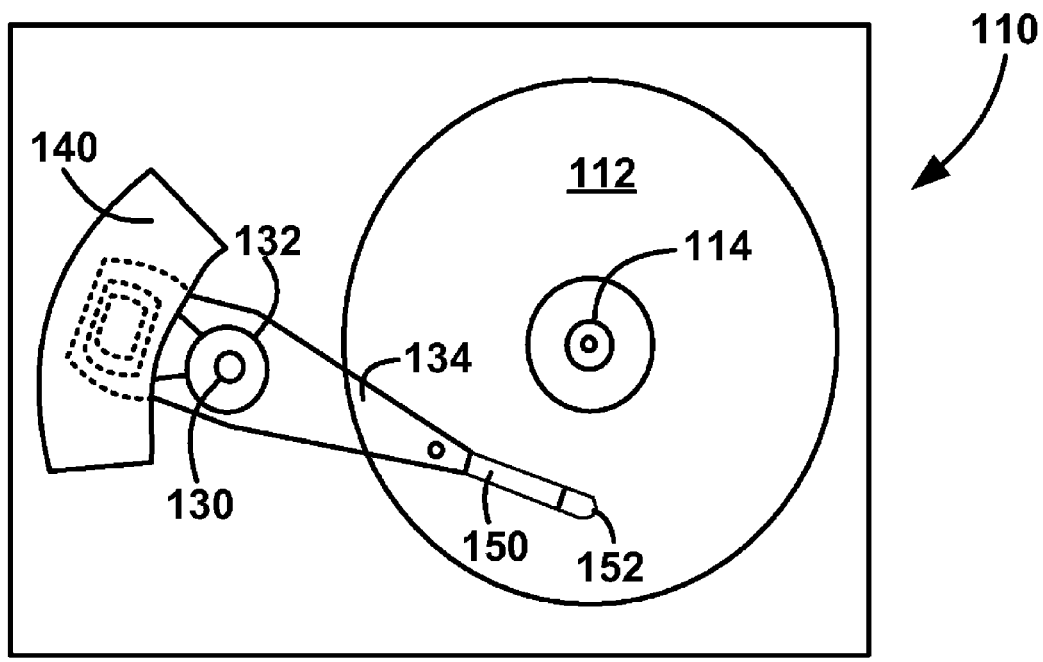
FIG. 2 illustrates a top view of a disk drive system, according to an embodiment of the invention.

FIG. 1 and FIG. 2 show a side view and a top view, respectively, of a disk drive system designated by the general reference number 110. The disk drive system 110 comprises a plurality of stacked magnetic recording disks 112 mounted to a spindle 114. The disks 112 may be conventional thin film recording disks or other magnetically layered disks. The spindle 114 is attached to a spindle motor 116, which rotates the spindle 114 and disks 112. A chassis 120 provides a housing for the disk drive system 110. The spindle motor 116 and an actuator shaft 130 are attached to the chassis 120. A hub assembly 132 rotates about the actuator shaft 130 and supports a plurality of actuator arms 134. A rotary voice coil motor 140 is attached to chassis 120 and to a rear portion of the actuator arms 134.

A plurality of suspension assemblies 150 are attached to the actuator arms 134. A plurality of heads or transducers on sliders 152 are attached respectively to the suspension assemblies 150. The sliders 152 are located proximate to the disks 112 so that, during operation, the heads or transducers are in electromagnetic communication with the disks 112 for reading and writing. The rotary voice coil motor 140 rotates actuator arms 134 about the actuator shaft 130 in order to move the suspension assemblies 150 to the desired radial position on disks 112. The shaft 130, hub 132, arms 134, and motor 140 may be referred to collectively as a rotary actuator assembly.

A controller unit 160 provides overall control to system 110. Controller unit 160 typically includes (not shown) a central processing unit (CPU), a memory unit and other digital circuitry and executable instructions, although it should be apparent that one skilled in the computer arts could also enable these aspects as firmware logic. Controller unit 160 is connected to an actuator control/drive unit 166 that in turn is connected to the rotary voice coil motor 140. This configuration also allows controller 160 to control rotation of the disks 112. A host system 180, typically a computer system, is connected to the controller unit 160. The host system 180 may send digital data to the controller 160 to be stored on disks 112, or it may request that digital data at a specified location be read from the disks 112 and sent to the system 180. The basic operation of DASD units is well known in the art and is described in more detail in The Magnetic Recording Handbook, C. Dennis Mee and Eric D. Daniel, McGraw-Hill Book Company, 1990.

An Adaptive Data Recovery Procedure

With perpendicular magnetic recording (PMR), the media has magnetization oriented in the up-down direction rather than in the longitudinal direction as with traditional longitudinal recording. To achieve efficient writing, a PMR write head needs to generate fields having the perpendicular components higher than the longitudinal components. For example, a single pole PMR head combined with media having a soft-under-layer provides a strong perpendicular write field, while the longitudinal component is much reduced. Rather than being generated from the gap as with longitudinal recording, the field from PMR write-head is generated from the pole surface and collected by the SUL. The foregoing concepts regarding PMR are also applicable to perpendicular recording with patterned media.

In modern drives, the head has a skew angle with respect to the track direction when the head operates at inner or outer radii. Thus, the corners of a rectangular pole will encroach upon neighboring tracks when the head is operating at a skew angle. Fabricating a narrow trapezoidal pole with a well-controlled bevel angle helps prevent the fields from the pole surface erasing data in neighboring tracks. Additional insight into PMR is described in "Perpendicular Magnetic Recording Technology", by Roger Wood et al., Hitachi Global Storage Technologies, 2007.

With PMR, a recording unit takes a form characteristic of the "footprint" of the write pole. Thus, a trapezoidal write pole effectively records a trapezoidal-shaped recording unit having a magnetic direction either into (down) or out of (up) the media, a triangular pole effectively records a triangular-shaped recording unit, and so on. It is the transition from one recording unit to the adjacent recording unit that represents a bit of data.

A "bath tub" curve generally looks like the cross section of a bath tub. In the context of a symmetric bath tub curve representing the data error rate (y-axis) vs. cross track position of a head (x-axis), at the on-track location (e.g., track centerline) there is minimal error and moving in either direction away from the on-track location there is generally an equal error rate at symmetric locations about the on-track, with an increasing error rate the further you get from on-track, within limits. The curve may not in actuality be a parabolic curve, mathematically, but a parabola provides an example to aid in envisioning a bath tub curve.

Because of the "footprint" effect associated with PMR write poles, the squeeze to adjacent tracks is a strong function of the radial position of the head. This leads, in typical high track density scenarios, to an asymmetrically shaped "bath tub" curve after read/write operations to adjacent tracks. Consequently, the most appropriate DRP step for a given miss becomes a function of the radial position of the actuator. For example, with a trapezoidal pole, at the disk outer diameter it is more likely that the outer diameter side of the track is squeezed while at the disk inner diameter it is more likely that the inner diameter side of the track is squeezed. Therefore, DRP steps and/or sequences can be set accordingly. For example, at the outer diameter portion of the disk media the DRP could position the head more toward the inner diameter of the track, i.e., the less likely squeezed side. Another approach could be to adjust the DRP to position the head to a greater off-track distance to the less likely squeezed side of the track. In doing so, the system would minimize track run-out while maximizing the DRP success rate.

Figure 3:
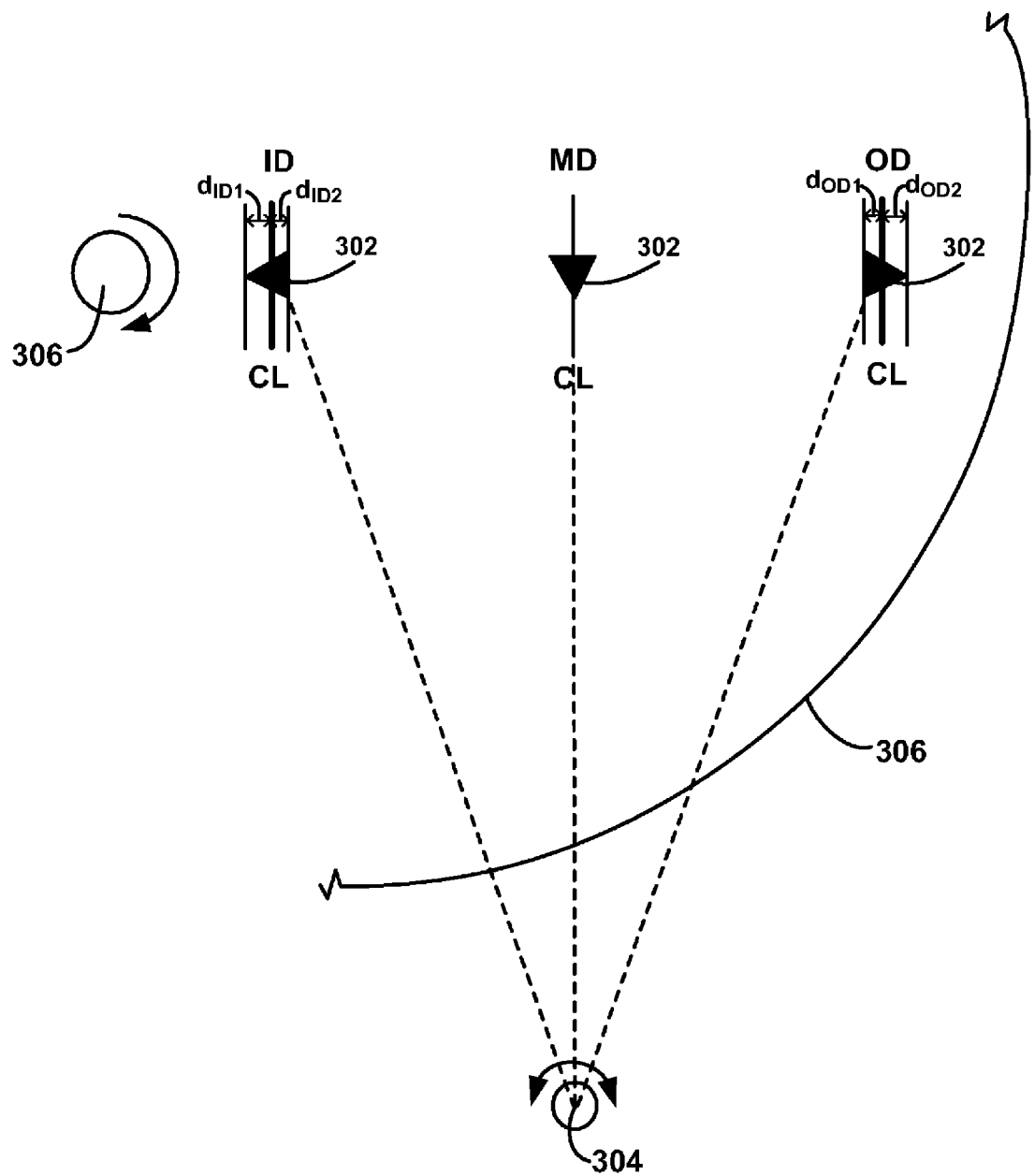
FIG. 3 is a diagram illustrating an example of how the shape of a write pole in conjunction with head skew angle can affect recording, according to an embodiment of the invention.

FIG. 3 is a diagram illustrating an example of how the shape of a write pole in conjunction with head skew angle can affect recording, according to an embodiment of the invention. FIG. 3, not to scale, illustrates a triangular head 302 which rotates about a rotation axis 304. Head 302 is shown in three different positions relative to a disk 306 rotating about a rotation axis 308. Head 302 is shown at an inner diameter (ID) location over disk 306, at a middle diameter (MD) position over disk 306, and at an outer diameter (OD) position over disk 306. Each depiction of head 302 is shown substantially centered, in a radial direction, over the centerline (CL) of a respective track.

As can be envisioned from FIG. 3, at the ID, even though the head is centered over the track (i.e., is "on-track"), one of the vertices of the triangular head is inboard of the centerline because of head skew and the geometry of the head. Thus, the shape of the head extends more inboard than outboard (i.e., $d_{ID1} > d_{ID2}$). Likewise, at the OD, even though the head is on-track one of the vertices of the triangular head is outboard of the centerline because of head skew and the geometry of the head. Thus, the shape of the head extends more outboard than inboard (i.e., $d_{OD1} < d_{OD2}$). Consequently, at inner diameter tracks, squeeze is most likely to occur toward the inner direction and, at outer diameter tracks, squeeze is most likely to occur toward the outer direction. Therefore, an effect of the shape of the write pole in conjunction with head skew angle is an asymmetrical error rate bath tub curve.

According to embodiments, the PMR "footprint" effect is considered in conjunction with the shape of the write pole, and in conjunction with the radial position, to deduce how the shape of the pole affects its corresponding bath tub curve. Data recovery steps/tables are adjusted accordingly to provide a more efficient and performant DRP process.

FIG. 4 is a flow diagram illustrating a process for performing data recovery in a data storage device, according to an embodiment of the invention.

At block 402, the radial position of a read/write head relative to a storage medium is determined in response to a miss. The manner in which the radial position of the head is determined may vary from implementation to implementation. HDDs are equipped with internal means for determining the head position. According to an embodiment, the location of the head relative to the storage medium involves determining whether the head is within a range of tracks corresponding to (1) inner diameter tracks, (2) middle diameter tracks, or (3) outer diameter tracks. However, the number of ranges in which the tracks are classified may vary from implementation to implementation and are not limited to the foregoing three ranges. In which range the head location falls is indicative of the head skew corresponding to the miss and the orientation of the head over the disk. As mentioned, the head skew and head orientation can be used to infer the direction of squeeze and, therefore, to optimize the DRP steps to be performed to recover the data in response to the miss.

A read "miss" is when a data access, or read, operation is performed unsuccessfully. That is, the read element of the head is positioned over a particular location (i.e., track) of the disk at which data is expected to be stored, within the precision of the servo-actuator system, but the head is unable to successfully read the data at that location. Often, such a read failure, or miss, is due to the fact that the track was squeezed by an adjacent write operation. One reason that the data may have been squeezed is because of the head shape-skew effect described above.

A data recovery procedure, or "DRP", refers to a logical procedure performed within an HDD in response to a miss, in order to recover the missed data. In the case of a read operation, the DRP attempts to locate where the data is actually recorded. A data recovery procedure is typically embodied as programming logic characterizing steps that should be taken in order to recover the missed data, such as in the form of one or more look-up tables, or the like. For example, in response to a miss DRP logic may move the head x degrees in a certain first direction, then x more degrees in the first direction, then x degrees in the other second direction, then x more degrees in the second direction, then 3x degrees in the first direction, and so on until the data is located or the operation times out. However, the architecture of and process associated with a DRP may vary from implementation to implementation.

At block 404, data recovery information is accessed which corresponds to the radial position of the head. For a non-limiting example, if at block 402 the head is determined to be at a disk inner diameter track, then certain corresponding data recovery information is accessed; if at a disk middle diameter track, then different certain corresponding data recovery information is accessed; and if at a disk outer diameter track, then still different corresponding data recovery information is accessed.

The term "data recovery information" refers to information that characterizes one or more DRP steps to be performed in response to a miss corresponding to the radial position determined at block 402. Thus, such radial position-based data recovery information effectively comprises a refined, deduced subset of all the steps available to the data recovery procedure. According to an embodiment, such radial position-based data recovery information as described herein is based on the physical shape of the write pole of the read/write head (also referred to as the write element pole), e.g., trapezoidal, triangular, etc., and how the shape of the pole affects the cross-track error (e.g., the error rate bath tub curve) associated with the head.

A "head-disk interface" (HDI) refers to a particular pairing of a read/write head and the corresponding disk (generally, "storage medium") with which the head is configurationally paired. Hard disk drives often comprise multiple disks and multiple heads. Thus, each HDI of a hard disk drive has corresponding cross-track error rates that may manifest at various disk locations.

According to an embodiment, the cross-track error affected by the physical shape of the write pole of an associated read/write head, as described in reference to block 404, corresponds to a particular head-disk interface. Therefore, each different HDI in a HDD device could be associated with a corresponding bath tub curve and corresponding data recovery information for purposes of the DRP. According to a related embodiment, the cross-track error corresponding to a particular HDI is based on actual measurement data corresponding to the particular HDI. For example, such measurement data could be gathered via test procedures during manufacturing of an HDD or via data gathering procedures during operation of an HDD, including the tracking of results from previous data recovery attempts.

All of the foregoing approaches to collecting error rate or other measurement data corresponding to a particular HDI would likely include observation of effects of manufacturing defects in the shape of the write pole. For example, such HDI-based data would characterize the effects of a non-uniformly shaped write pole, such as an asymmetrically shaped pole. Consequently, the particular data recovery information corresponding to a particular HDI can account for how an actual defected shape of a particular write pole affects how data is actually written to and read from a paired disk.

Note that the shape of the write pole may affect not only how data is written to or read from a particular track, but may also affect adjacent tracks. That is, the effect of a head's shape is not localized to the particular track at which the miss (block 402) occurred, for example, a read miss may be attributed to an adjacent track write operation as well as a write operation involving the target track. This is the nature of the squeeze effect.

For a non-limiting example of how the teachings herein may be applied to a hard disk drive data recovery procedure, consider the following process involving a perpendicular magnetic recording read/write head having a trapezoidal write pole. In response to a miss, the radial position of the head is identified. Depending on the position of the head relative to the corresponding storage medium, select a left or right off-track DRP. For example, if the miss occurs at an outer diameter track, then first move the head x radial degrees toward the inner diameter, away from the likely squeezed location and toward the likely data location. Likewise, if the miss occurs at an inner diameter track, then first move the head x degrees toward the outer diameter, away from the likely squeezed location and toward the likely data location. If the foregoing data recovery (DRP) step was successful, then clear the DRP. If the foregoing DRP step was unsuccessful, then increase the off-track position continuing in the same direction. If the foregoing is not successful in recovering the desired data, then move the head y radial degrees in the other direction, to the less exposed side of the bath tub curve. For example, if the miss occurred at an outer diameter track, then now move the head off-track toward the outer diameter, or if the miss occurred at an inner diameter track, then now move the head toward the inner diameter. This is only one non-limiting example of how a DRP can be made to account for the effect of the shape of the write pole in conjunction with the head skew associated with a radial position.

It should be understood that although various embodiments of the present invention are described in the context of a data recovery procedure in a hard disk drive (HDD), the foregoing embodiments are merely exemplary of various implementations of principles of the present technology. Therefore, it should be understood that various embodiments of the invention described herein may apply to any devices, configurations, or systems in which data recovery procedures are employed in response to a miss. Further, it should be understood that although various embodiments of the present invention are described in the context of a data recovery procedure in the context of perpendicular magnetic recording (PMR), generally, the foregoing embodiments are merely exemplary of various implementations of principles of the present technology. Therefore, it should be understood that various embodiments of the invention described herein may apply, for example, to uses with patterned media, e.g., perpendicular patterned media.

The foregoing descriptions of specific embodiments of the present invention have been presented for purposes of illustration and description. They are not intended to be exhaustive or to limit the invention to the precise forms disclosed, and many modifications and variations are possible in light of the above teachings. The embodiments described herein were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A hard disk drive (HDD) device comprising:
   a housing;
   a magnetic storage medium coupled with said housing, said magnetic storage medium rotating relative to said housing;
   an actuator arm coupled with said housing, said actuator arm moving relative to said magnetic storage medium;
   a slider assembly comprising a perpendicular magnetic recording read/write head comprising a write element which magnetically writes data to said magnetic storage medium and a read element which magnetically reads data from said magnetic storage medium;
   one or more processors; and
   one or more sequences of instructions which, when executed by said one or more processors, cause performance of,
      in response to a miss, determining the radial position of said read/write head relative to said storage medium,
      accessing data recovery information corresponding to said radial position, wherein said data recovery information characterizes one more data recovery steps to be performed in response to a miss corresponding to said radial position, and
      wherein said data recovery information is based on the physical shape of a pole of said write element and how said physical shape of said pole affects data cross-track error associated with said read/write head.

2. The hard disk drive device recited in claim 1, wherein accessing said data recovery information comprises selecting data recovery information corresponding to one from a group consisting of (a) a range of tracks corresponding to inner diameter tracks of said storage medium, (b) a range of tracks corresponding to middle diameter tracks of said storage medium, and (c) a range of tracks corresponding to outer diameter tracks of said storage medium.

3. The hard disk drive device recited in claim 1, wherein said read/write head is a particular head, and wherein said data cross-track error corresponds to a particular head-disk interface associated with said particular head.

4. The hard disk drive device recited in claim 3, wherein said data cross-track error corresponding to said particular head-disk interface is based on actual measurement data corresponding to said particular head-disk interface.

5. The hard disk drive device recited in claim 4, wherein said measurement data comprises data associated with a manufacturing defect in said shape of said pole.

6. The hard disk drive device recited in claim 1, wherein said shape of said pole is substantially trapezoidal, and wherein said data recovery information is based on how said trapezoidal shape of said pole affects how data written to said storage medium may be biased in a particular direction because of said trapezoidal shape in association with a head skew angle corresponding to said radial position of said read/write head.

7. The hard disk drive device recited in claim 1, wherein said shape of said pole is substantially triangular, and wherein said data recovery information is based on how said triangular shape of said pole affects how data written to said storage medium may be biased in a particular direction because of said triangular shape in association with a head skew angle corresponding to said radial position of said read/write head.

8. A non-transitory computer-readable medium storing one or more sequences of instructions for performing a data recovery procedure in a data storage device comprising a transducer for reading from and/or writing data to a storage medium, said instructions which, when executed by one or more processors, cause performance of:
in response to a miss, determining the radial position of said transducer relative to said storage medium,
accessing data recovery information corresponding to said radial position, wherein said data recovery information characterizes one more data recovery steps to be performed in response to a miss corresponding to said radial position, and
wherein said data recovery information is based on the physical shape of a write pole of said transducer and how said physical shape of said write pole affects data cross-track error associated with said transducer.

9. The non-transitory computer-readable medium recited in claim 8, wherein accessing said data recovery information comprises selecting data recovery information corresponding to one from a group consisting of (a) a range corresponding to inner diameter tracks of said storage medium, (b) a range corresponding to middle diameter tracks of said storage medium, and (c) a range corresponding to outer diameter tracks of said storage medium.

10. The non-transitory computer-readable medium recited in claim 8, wherein said transducer is a particular transducer, and wherein said data cross-track error corresponds to a particular transducer-storage medium interface associated with said particular transducer.

11. The non-transitory computer-readable medium recited in claim 10, wherein said data cross-track error corresponding to said particular transducer-storage medium interface is based on actual measurement data corresponding to said particular transducer-storage medium interface.

12. The non-transitory computer-readable medium recited in claim 11, wherein said measurement data comprises data associated with a manufacturing defect in said shape of said write pole.

13. The non-transitory computer-readable medium recited in claim 8, wherein said shape of said write pole is substantially trapezoidal, and wherein said data recovery information is based on how said trapezoidal shape of said write pole affects how data written to said storage medium may be biased in a particular direction because of said trapezoidal shape in association with a head skew angle corresponding to said radial position of said transducer.

14. The non-transitory computer-readable medium recited in claim 8, wherein said instructions further cause performance of:
performing one or more of said data recovery steps to move said transducer to complete a read operation corresponding to said miss.

15. A data recovery method for locating data stored on a storage medium of a hard disk drive device, the method comprising:
in response to a read miss, determining the radial position of a read/write head relative to said storage medium,
accessing data recovery information corresponding to said radial position, wherein said data recovery information characterizes one more data recovery steps to be performed in response to a miss corresponding to said radial position, and
wherein said data recovery information is based on the physical shape of a write pole of said read/write head and how said physical shape of said write pole affects data cross-track error associated with said read/write head.

16. The data recovery method recited in claim 15, wherein accessing said data recovery information comprises selecting data recovery information corresponding to one from a group consisting of (a) a range corresponding to inner diameter tracks of said storage medium, (b) a range corresponding to middle diameter tracks of said storage medium, and (c) a range corresponding to outer diameter tracks of said storage medium.

17. The data recovery method recited in claim 15, wherein said read/write head is a particular read/write head, and wherein said data cross-track error corresponds to a particular head-disk interface associated with said particular read/write head.

18. The data recovery method recited in claim 17, wherein said data cross-track error corresponding to said particular head-disk interface is based on actual measurement data corresponding to said particular head-disk interface.

19. The data recovery method recited in claim 18, wherein said measurement data comprises data associated with a manufacturing defect in said shape of said write pole.

20. The data recovery method recited in claim 15, wherein said shape of said write pole is substantially trapezoidal, and wherein said data recovery information is based on how said trapezoidal shape of said write pole affects how data written to said storage medium may be biased in a particular direction because of said trapezoidal shape in association with a head skew angle corresponding to said radial position of said read/write head.

21. The data recovery method recited in claim 15, further comprising:
performing one or more of said data recovery steps to move said read/write head to complete a read operation corresponding to said miss.

* * * * *